Aug. 2, 1927. 1,637,365
K. A. WERNLÉ
SPUD FOR WASTE CONNECTIONS AND THE LIKE
Filed May 15, 1926
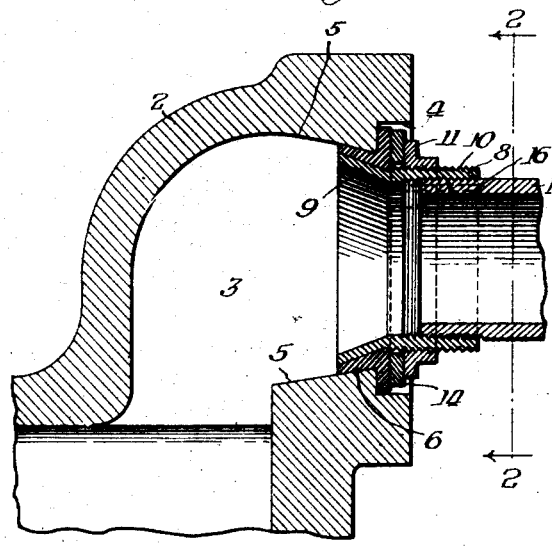
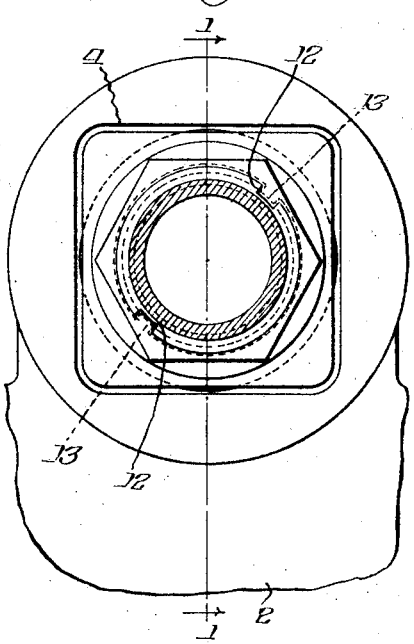
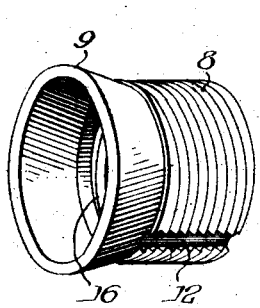 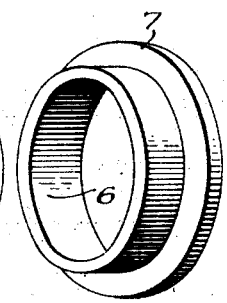 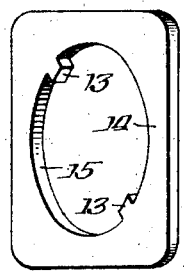 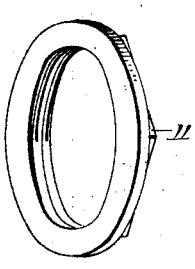
Witness:
Inventor
Karl A. Wernlé

Patented Aug. 2, 1927.

1,637,365

UNITED STATES PATENT OFFICE.

KARL A. WERNLÉ, OF CHICAGO, ILLINOIS, ASSIGNOR TO JAMES B. CLOW & SONS, OF CHICAGO, ILLINOIS, A CORPORATION OF ILLINOIS.

SPUD FOR WASTE CONNECTIONS AND THE LIKE.

Application filed May 15, 1926. Serial No. 109,448.

The invention hereof pertains to connections for waste outlets, fluid inlets and the like and more particularly to a spud connection adapted for interlocking non-leaking engagement in a waste or inlet opening or the like of a ceramic or other similar vessel, such as water closets, urinals, sinks, etc.

Heretofore spuds and other devices of similar character for connection to ceramic vessels and the like have comprised a cylindrical or sleeve-like portion terminating in an outwardly flared generally frusto-conical end portion adapted to engage within an opening in the ceramic vessel, the walls of which about the opening diverge inwardly more or less uniformly from the mouth thereof. The cylindrical portion of such a device has usually been threaded externally and internally, internally for engagement with a similarly threaded waste pipe or the like and externally for threaded engagement with a nut which, working against a round washer placed between it and the flared end of the spud, tended to compress a rubber or other resilient gasket or washer tightly between the flared portion of the spud and the adjacent walls of the ceramic vessel. In other words relative movement of the nut and spud serves to press the flared end of the spud against the resilient washer or gasket wedging it firmly against the interior sloped walls of the opening in the ceramic vessel to provide a water tight connection. However, slight but continued jarring or movements of the vessel and the pipe, to which it is connected through such a spud, relative to one another finally causes the nut to back up and loosen the connection between the spud and the vessel, resulting in a leaky connection if not permitting the connection to become entirely disconnected.

There is another objection to the ordinary connections of the character above indicated in that when the spud or the like is being connected to the ceramic or other similar vessel it is difficult, if not impossible, to tighten the clamping nut as tightly as it should be tightened without putting a Stilson wrench or other holding means on the cylindrical or sleeve-like end of the spud to prevent it from turning with the clamping nut, thereby marring the threads. This characteristic of former connections results in serious inconveniences to the plumber or other person making the coupling, as well as prevents a coupling from being made absolutely water tight in many cases. It also often happens that the edges of the mouth of the opening whether inlet or outlet of the ceramic vessel, are rough and sharp and any turning movement of the gasket or washer interposed between the spud and the edges will abrade or cut through the washer with the inevitable result of an unsatisfactory, temporary and possibly leaky connection.

With my invention I have overcome all of the foregoing difficulties and objections encountered heretofore, as well as many objections not enumerated and provide a connection which may be permanently made water tight, thus obviating the necessity for frequent inspection of the joint or renewal of the washer or other parts.

It is accordingly a primary object of my invention to provide a connection which may be quickly and effectively made, one which will be simple in construction and economical to manufacture and one in which relative movement between the parts after the coupling has been made will be prevented.

A further object of the invention is to provide a spud of simple construction which may be economically manufactured and readily coupled and uncoupled from an outlet or inlet connection to a ceramic vessel or the like.

Still further objects, including the details of construction and arrangement of the parts of a full or any subassembly embodying my invention, will be or should become readily appreciated after a perusal of the description and claims and after viewing the drawings in which:

Fig. 1 is a longitudinal sectional view through a spud assembly in connection with a water inlet of a ceramic vessel, such as a wall closet, taken along the line 1—1 of Fig. 2.

Fig. 2 is a sectional elevation taken along the line 2—2 of Fig. 1.

Fig. 3 is a perspective view of a spud constructed in accordance with the invention.

Fig. 4 is a perspective view of a rubber or other gasket for use in connection with the form of the invention shown, Fig. 5 is a perspective view of a lock washer for the connection, and Fig. 6 is a perspective view of a coupling or clamping nut for the connection.

A closet bowl 2 is provided with a water inlet opening 3, the mouth of which is provided with a recess 4, in this instance rectangular in shape, and with inwardly diverging walls 5 against portions of which a flange 6 of a resilient washer or other gasket 7 is normally compressed when the spud is coupled in position. A spud having a cylindrical or sleeve-like body portion 8 and an outwardly flared frusto-conical portion 9 is adapted to be inserted within the mouth of the opening 3 of the vessel, the mouth at its narrowest diameter being made sufficiently large to permit the ready insertion of the flared end of the spud.

The body portion 8 of the spud may be externally threaded, as shown at 10, for the reception of a coupling or clamping nut 11 similarly threaded and is provided with one or more longitudinal grooves or slots 12 (two being shown) for the reception of one or more splines 13 formed on a lock or holding washer 14 having an opening 15 of sufficient diameter to permit its being slidingly received over the threaded shank or cylindrical portion of the spud. The perimeter of the washer 14 is shaped to conform to the perimeter of the recess 4 in the ceramic vessel, although is is preferred that the washer be slightly smaller than the recess in order to provide a clearance space therebetween, while the spud may be suitably coupled to a waste or fluid supply pipe in any desirable manner, I prefer to thread it internally, as shown at 16, for coupling the the same to a waste or fluid supply pipe 17, as will be noted from Fig. 1.

In assembling or connecting the spud to the ceramic vessel the flared portion 9 of the spud is passed through the opening in the vessel, the resilient gasket or washer 7 is passed over the outer end of the spud and the flange 6 thereof inserted between the flared portion of the spud and the adjacent surrounding walls of the opening, the washer 14 with its splines or keys 13 in the slots or grooves 12 is slipped into place behind the washer and the coupling or clamping nut 11 is threaded up behind the washer until the flared portion 9 of the spud has been drawn backward relative to the nut and surrounding walls of the ceramic vessel to securely clamp the flange 6 between the flared portion of the spud and the inwardly diverging walls of the vessel. Owing to the rectangular or other irregular shape of the lock washer 14 which is prevented from turning in the recess 4 by reason thereof and the similar shape of such recess, and the interengagement of the splines or keys 13 with the slots or grooves 12 of the body portion of the spud, the latter cannot turn with the nut 11 or with respect to the ceramic vessel when the nut is being tightened or loosened. Consequently the washer 7 cannot be rotated purposely or accidentally and a permanently tight connection is obtained and assured and the objections to prior constructions, some of which have been hereinabove enumerated, are entirely overcome or obviated.

Many variations and changes of construction, arrangement and operation may be made in the embodiment of my invention illustrated, as well as many changes in equivalent structures without departure from the spirit of the invention and for such reasons I do not desire to be limited except by the spirit of the invention and the purview of the appended claims.

I claim:

1. In a connection assembly of the character described, a spud having a shank portion and an outwardly inclined end portion adapted to be disposed within an opening in a ceramic vessel or the like, the opening in said vessel being of slightly greater diameter at the mouth thereof than the greatest cross sectional dimension of the spud and increasing in diameter inwardly for a distance sufficient to afford a substantial abutment for a substantial portion of the length of the inclined portion of the spud and said opening at the exterior portion of the mouth thereof being substantially polygonal in shape, a resilient member adapted to be disposed between the inclined portion of the spud and the adjacent walls of the vessel, means for clamping the resilient member between the inclined portion of the spud and the adjacent walls of the vessel, and a polygonal member engaged in the polygonal shaped portion of the mouth of said opening and having means non-rotatively engaged with said spud for holding said spud against rotation in said opening.

2. In a connection assembly of the character described having a spud provided with a shank portion and an outwardly inclined end portion adapted to be disposed within an opening in a ceramic vessel and the like, the opening in said vessel being of slightly greater diameter at the mouth thereof than the greatest cross sectional dimension of the spud and increasing in diameter inwardly for a distance sufficient to afford a substantial abutment for a substantial portion of the length of the inclined portion of the spud and said opening at the exterior portion of the mouth thereof being substantially polygonal in shape, a resilient member adapted to be disposed between the said inclined portion of the spud and the adjacent walls of the vessel, means for clamping the resilient member between the inclined portion of the spud and the adjacent walls of the vessel, and a polygonal member engaged in the polygonal shaped portion of the mouth of said opening and interposed between said member and said clamping means, said polygonal member having means whereby it is slidably but non-rotatably engaged with the shank portion of said spud for holding said spud against turning when connected to the vessel.

3. A connection for closet bowls and the like having a polygonally sided connection opening, comprising a tubular exteriorly threaded spud outwardly flared at one end and provided with an external longitudinally disposed groove, a nut threaded onto said spud for effecting a clamping connection between the flared end of said spud and the surrounding walls of an opening in the bowl, and an externally polygonally sided member engaged in said groove against rotation with respect to said spud and movable longitudinally of the spud for a substantial distance therealong for securing said spud against rotation with respect to said bowl over a substantial distance of adjustment of said member with respect to said bowl when in said polygonally sided opening.

In witness of the foregoing I affix my signature.

KARL A. WERNLÉ.